United States Patent

[11] 3,624,483

[72] Inventor Luther L. Genuit
 Scottsdale, Ariz.
[21] Appl. No. 66,277
[22] Filed Aug. 24, 1970
[45] Patented Nov. 30, 1971
[73] Assignee Honeywell Information Systems, Inc.

[54] SWITCHING REGULATOR USING LOW-VOLTAGE DIODES
 5 Claims, 2 Drawing Figs.

[52] U.S. Cl. .................................................. 321/2,
 321/43, 321/45 ER
[51] Int. Cl. .................................................. H02m 3/22
[50] Field of Search .................................................. 321/2, 18,
 43–45, 45 C

[56] References Cited
 UNITED STATES PATENTS
 3,278,827 10/1966 Corey et al. .................. 321/45 C
 3,319,147 5/1967 Mapham .................. 321/45 X
 3,518,526 6/1970 Genuit .................. 321/2
 3,263,152 7/1966 Walker .................. 321/45 C
 3,286,155 11/1966 Corey .................. 321/45 C
 3,406,327 10/1968 Mapham et al. .................. 321/45
 3,538,405 11/1970 Borden et al. .................. 321/2 X
 3,315,144 4/1967 Poss .................. 321/18
 3,443,194 5/1969 Cielo .................. 321/18 X Primary Examiner—William M. Shoop, Jr.
Attorneys—Edward W. Hughes, Lloyd B. Guernsey, Frank L. Neuhauser, Oscar B. Waddell and Joseph B. Forman ABSTRACT: A pair of silicon-controlled rectifiers, a center tapped inductor, a pair of commutating capacitors, a transformer, and a pair of low-voltage diodes convert a relatively large value of unregulated DC voltage to a relatively small value of regulated DC voltage. A pair of conventional diodes connected across the commutating capacitors limit the reverse voltage across these capacitors and limit the operating currents and voltages in the other elements of the switching regulator.

SWITCHING REGULATOR USING LOW-VOLTAGE DIODES

BACKGROUND OF THE INVENTION

This invention relates to power supplies and more particularly to power supplies of the switching regulator type which are designed to supply a regulated DC voltage.

In high-speed data processing systems, microcircuits are used to reduce the physical size of the system and to increase the operating speed. These microcircuits are built in modules each of which may replace a large number of circuits using discrete circuit components. Each of these microcircuit modules requires as much power as several modules using discrete components so that the power required in a single cabinet of a data processing system using microcircuit modules is several times as large as the power required in a single cabinet of a system using discrete components when the two cabinets have the same physical size. In addition, high speed microcircuits usually use a much smaller value of DC voltage than circuits employing discrete components. For example, in one of the high speed microcircuits the required DC voltage is approximately three volts. This voltage must be well regulated to provide a constant value of DC voltage for the microcircuits, otherwise variation in DC voltage may produce error signals in the data processing system. The power supplied to any system is a product of the voltage and current so that a low voltage power supply must provide large amounts of current in order to provide a large amount of power.

In high-speed data processing systems using relatively low values of voltage, prior art switching regulators employing a transformer, a pair of silicon controlled rectifiers and a pair of signal sources have been used to convert an unregulated DC voltage such as one hundred volts to an accurately regulated DC voltage such as three volts. The silicon controlled rectifiers are employed as switches between the source of unregulated DC voltage and the transformer primary. The regulated DC voltage is obtained from a secondary winding in the transformer. The secondary winding of the transformer is connected to a diode and to a filter circuit.

Prior art switching regulators store energy in the magnetic field of the core of the transformer when electrical current flows in the primary winding of the transformer. This energy is transferred from the core to a secondary winding of the transformer when current in the primary winding decreases. The energy is trnasferred to the secondary winding at a rapid rate which causes relatively large pulses of current to flow in the secondary winding of the transformer. The power loss in any winding of a transformer is proportional to the square of the electrical current in that winding so that these large pulses of current cause a relatively large power loss in the secondary winding and cause the efficiency of the prior art switching regulator to be relatively low. Storage of relatively large amounts of energy in the core of the transformer also causes losses in the core and further reduces the efficiency of the prior art switching regulator.

The present invention alleviates the disadvantages of the prior art by substituting an inductor for the primary winding of the transformer used in the prior art. The inductor winding is center tapped and is connected to the primary winding of a current transformer which couples energy to a secondary winding of the transformer. The secondary windings of the transformer are connected to a pair of low voltage diodes which are connected to the load. When current flows in the inductor and in the primary winding of the current transformer, current also flows through one of the diodes to the load so that energy is transferred from the high voltage supply to the load without storing large amounts of energy in the core of the inductor, thus causing core losses to be reduced. This transfer of energy to the diode-load circuit without storing large amounts of energy in the inductor core also produces current pulses which have lower peak values and a longer time duration so that power losses in the transformer windings are reduced and efficiency is increased.

Another disadvantage of the prior art switching regulator is that the storage of energy in the transformer produces a relatively large value of reverse voltage across the diodes so that a diode having a relatively large peak inverse voltage rating must be used. This large reverse voltage in the prior art regulators precludes use of the new "hot-carrier" diodes in prior art regulators. These hot-carrier diodes have a very low forward voltage drop and very low power loss, but also have a relatively low reverse voltage rating.

The instant invention uses a pair of conventional diodes to limit the operating current and voltages in the regulator so that a relatively small value of reverse voltage appears across the diode in the load portion of the circuit. Thus a hot-carrier diode having a relatively low inverse voltage rating can be used. These diodes have a relatively low forward voltage drop so that the power loss in the diode is low and the efficiency of the switching regulator is further increased. The increased efficiency causes the regulator to provide more output current for a predetermined value of input current.

It is, therefore, an object of this invention to provide a new and improved switching regulator having improved efficiency.

Another object of this invention is to provide a new and improved switching regulator having reduced core losses.

A further object of this invention is to provide a switching regulator having reduced losses in the windings.

A still further object of this invention is to provide a new and improved switching regulator which may use diodes having a decreased forward voltage drop.

Another object of this invention is to provide a new and improved switching regulator which may use diodes having a lower peak inverse voltage rating.

A further object of this invention is to provide a new and improved switching regulator having an increased current output.

SUMMARY OF THE INVENTION

The foregoing objects are achieved in accordance with one embodiment of the present invention by employing a center tapped inductor, a pair of silicon controlled rectifiers, a transformer, a pair of signal sources, a pair of capacitors, a pair of low-voltage diodes and a pair of conventional diodes. The silicon controlled rectifiers are employed as switches between the source of unregulated DC voltage and the center tapped inductor. The primary of the transformer is connected between the center tap of the inductor and the capacitors which are connected to the source of unregulated DC voltage. The conventional diodes are connected across the capacitors so that the reverse voltage across the capacitors is limited. This limits the reverse voltage across the low-voltage diodes by limiting the operating voltages and currents in the elements of the switching regulator. The regulated DC voltage is obtained from the low-voltage diodes which are connected to the secondary windings of the transformer.

Other objects and advantages of this invention will become apparent from the following description when taken into connection with the accompanying drawings.

DESCRIPTION OF THE PREFERRED EMBODIMENT

Figure 1:
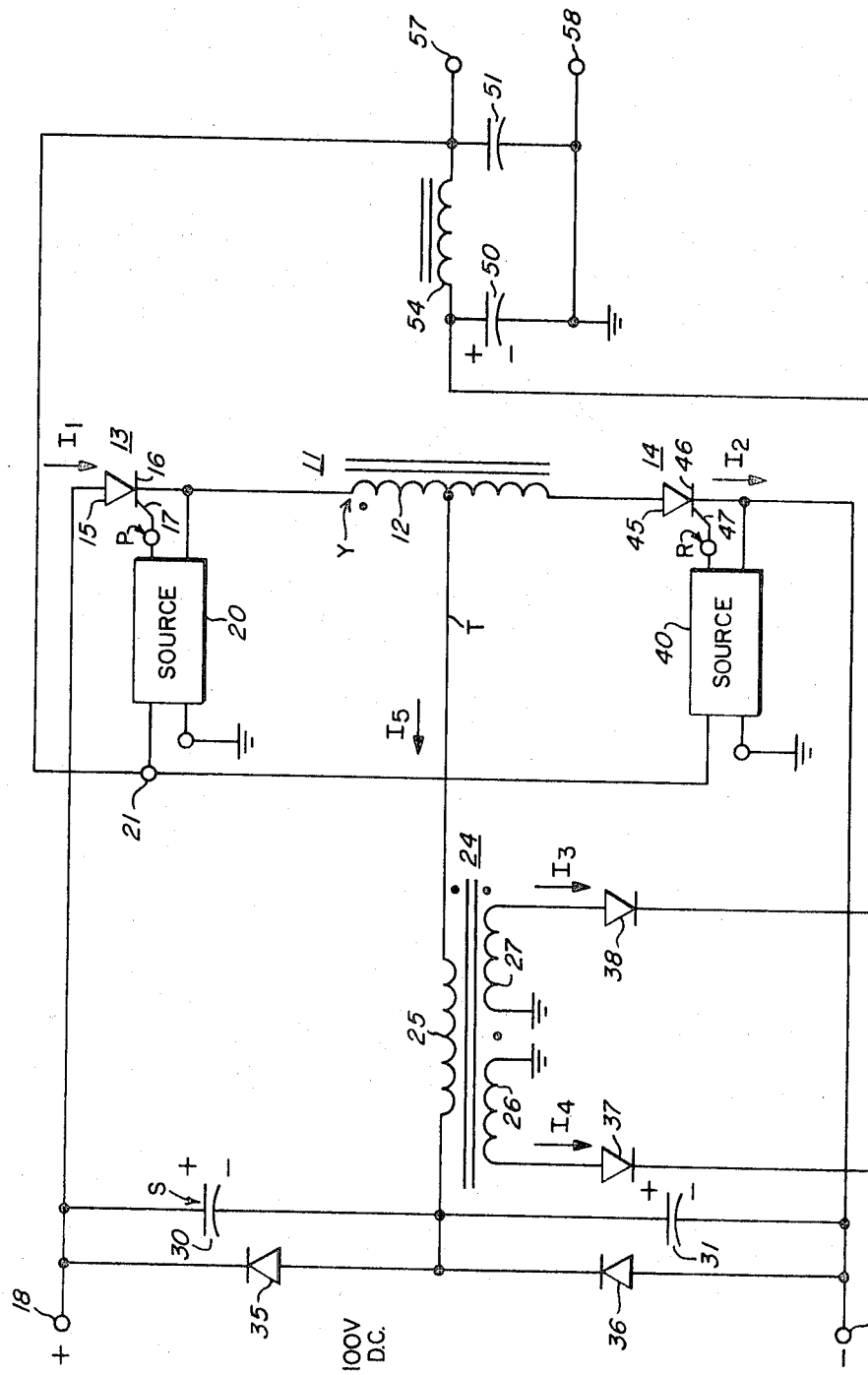
FIG. 1 is a schematic diagram of one embodiment of the instant invention.

Referring more particularly to the drawing by the characters of reference, FIG. 1 discloses a switching regulator which is designed to provide a constant value of DC output voltage for a wide range of values of output current. As indicated in FIG. 1, a center tapped inductor 11 is coupled to a high voltage DC power supply having a positive output terminal 18 and a negative output terminal 19. A pair of silicon controlled rectifiers 13 and 14 controls the current supplied by the power supply to the winding of the inductor 11. An anode 15 of silicon controlled rectifier 13 is connected to the positive terminal 18 of the high voltage supply and cathode 16 of the silicon controlled rectifier 13 is connected to the upper end of winding 12 of the inductor 11. Gate 17 of silicon controlled rectifier 13 and cathode 16 are connected to a first signal source 20 which provides signal pulses to render rectifier 13 conductive. The anode 45 of silicon controlled rectifier 14 is connected to the lower end of the winding 12 and cathode 46 of silicon-controlled rectifier 14 is connected to the negative terminal 19 of the high-voltage power supply. A second signal source 40 is connected between gate 47 and cathode 46 of silicon controlled rectifier 14 to provide signal pulses to render rectifier 14 conductive.

The silicon controlled rectifier is a semiconductor device having an anode, a cathode and a gate. The silicon controlled rectifier can be used as an ON-OFF switch that can be turned on in a very few microseconds. Normally the silicon controlled rectifier cannot conduct current between anode and cathode thereof until a pulse of current larger than a threshold value flows from gate to cathode. If a positive voltage difference exists between the anode and the cathode when the pulse the current flows in the gate, the silicon controlled rectifier "fires" i.e., is rendered conductive, and a current will flow from the anode to the cathode. The rate at which current flow from anode to cathode increases when the silicon controlled rectifier fires must be limited to prevent damage to the rectifier. Once anode-cathode flow commences, the gate has no further control over such current flow. Current flow from anode to cathode in the rectifier can be terminated only by reducing the anode to cathode current below a "holding" or a minimum current value. A more detailed description of the operation of a silicon controlled rectifier can be found in the Silicon Controlled Rectifier Manual, Third Edition, 1964 published by the General Electric Company, Auburn, New York.

A transformer 24 provides DC isolation between the high-voltage power supply and the low-voltage output portion of the switching regulator shown in FIG. 1. Transformer 24 has a primary winding 25 which is connected between the center tap of the winding 12 and a pair of capacitors 30 and 31 which are connected in series across the high-voltage supply. Capacitors 30 and 31 provide predetermined quantities of energy to the inductor each time one of the silicon-controlled rectifiers is rendered conductive. Prior to time $t_1$ shown in FIG. 2, capacitor 30 of FIG. 1 is charged to the polarity shown in FIG. 1. At time $t_1$ a pulse from signal source 20 renders silicon controlled rectifier 13 conductive so that the voltage across capacitor 30 is applied to the upper half of the primary winding 12 causing a current $I_1$ to flow from the upper plate of capacitor 30 from anode 15 through cathode 16, through the upper half of winding 12 through primary winding 25 to the lower plate of capacitor 30. Current $I_1$ through primary winding 25 produces a voltage across secondary windings 26 and 27. This voltage is shown in waveform Z of FIG. 2. The voltage across secondary winding 27 causes diode 38 to be rendered conductive so that a current $I_3$ flows from the right end of winding 27 through diode 38 to the upper plate of capacitor 50, from the lower plate of capacitor 50 to ground and to the left end of winding 27. This current $I_3$ (shown in waveform U, FIG. 2) charges capacitor 50 to the polarity shown in FIG. 1.

Current $I_1$ through the inductor 12 causes an increase in flux in the core of inductor 12 and causes a small amount of energy to be stored in the core of inductor 12. At time $t_2$ capacitor 30 has been discharged so that capacitor 30 no longer supplies current through silicon-controlled rectifier 13 and through windings 12 and 25. At this time, the energy which was stored in the core of inductor 11 causes a voltage across the winding 12 to reverse so that the upper end of winding 12 now becomes negative and the center tap becomes positive, thereby causing current $I_1$ to continue to flow through windings 12 and 25 and to charge capacitor 30 to a polarity opposite the polarity shown in FIG. 1. When substantially all of the energy which was stored in the core of inductor 11 is transferred through transformer 25 to capacitor 50, the voltage across the upper half of winding 12 is reduced so that silicon controlled rectifier 13 is not longer rendered conductive. Diode 35 prevents the voltage across capacitor 30 from building up to a value greater than the voltage drop of diode 35, thereby limiting the voltage and currents in the circuit. If diodes 35 and 36 were omitted from the circuit the inductance of windings 12 in combination with the capacity of capacitors 30 and 31 would form a resonant circuit in which oscillation under short circuit conditions could produce relatively large values of voltages across the capacitors and across silicon controlled rectifiers 13 and 14. This large voltage could destroy controlled rectifiers 13 and 14. The full wave connection of secondary windings 26 and 27, diodes 37 and 38 and capacitor 50 cause the peak inverse voltage across diodes 37 and 38 to be twice the value of the output voltage so that low voltage diodes can be used.

Capacitor 31 also provides a predetermined quantity of energy to the transformer and the reactor each time silicon-controlled rectifier 14 is rendered conductive. At time $t_5$, a pulse from signal source 40 renders silicon-controlled rectifier 14 conductive so that current $I_2$ flows from the upper plate of capacitor 31 through the primary winding 25, through the lower half of inductor winding 12 to anode 45 and cathode 46 to the lower plate of capacitor 31. Current $I_2$ through the primary winding 25 causes a positive voltage to develop at the left end of secondary winding 26 so that a current $I_4$ (shown in waveform V of FIG. 2) flows through diode 37 to the upper plate of capacitor 50, from the lower plate of capacitor 50 to the right end of secondary winding 26 thereby charging capacitor 50. When capacitor 31 is discharged and the energy stored in inductor 11 is transferred to the capacitor 50 through transformer 24, the silicon controlled rectifier 14 is rendered nonconductive as described above. Current $I_5$ is the sum of currents $I_1$ and $I_2$ and is illustrated in waveform T of FIG. 2.

The amount of voltage across capacitors 50 and 51 can be controlled by controlling the frequency of the signal pulses which sources 20 and 40 apply to the gates of silicon-controlled rectifiers 13 and 14. The frequency of these signal pulses is determined by the value of the voltage applied to a control terminal 21. When an increase in the amount of current drawn by a load (not shown) connected across the terminals 57 and 58 in FIG. 1 causes the value of the voltage at control terminal 21 to fall below a predetermined reference level, the frequency of the output pulses from the signal sources 20 and 40 increases. This increase in the frequency of the output pulses causes an increase in the rate of energy delivered to capacitors 50 and 51 and increases the voltage at control terminal 20 to the predetermined reference lever. The voltage at output terminal 57 of the power supply controls the frequency of the pulses from signal sources 20 and 40 so that the voltage between output terminals 57 and 58 is substantially constant even when the current drawn from this power supply varies over a wide range of values.

In applications where AC loads or loads which do not require a filtered DC voltage are used the transformer 24, diodes 37 and 38 and the filter circuit comprising capacitors 50 and 51 and choke 54 can be eliminated. The AC load can be substituted for the primary winding 25 shown in FIG. 1.

Figure 2:
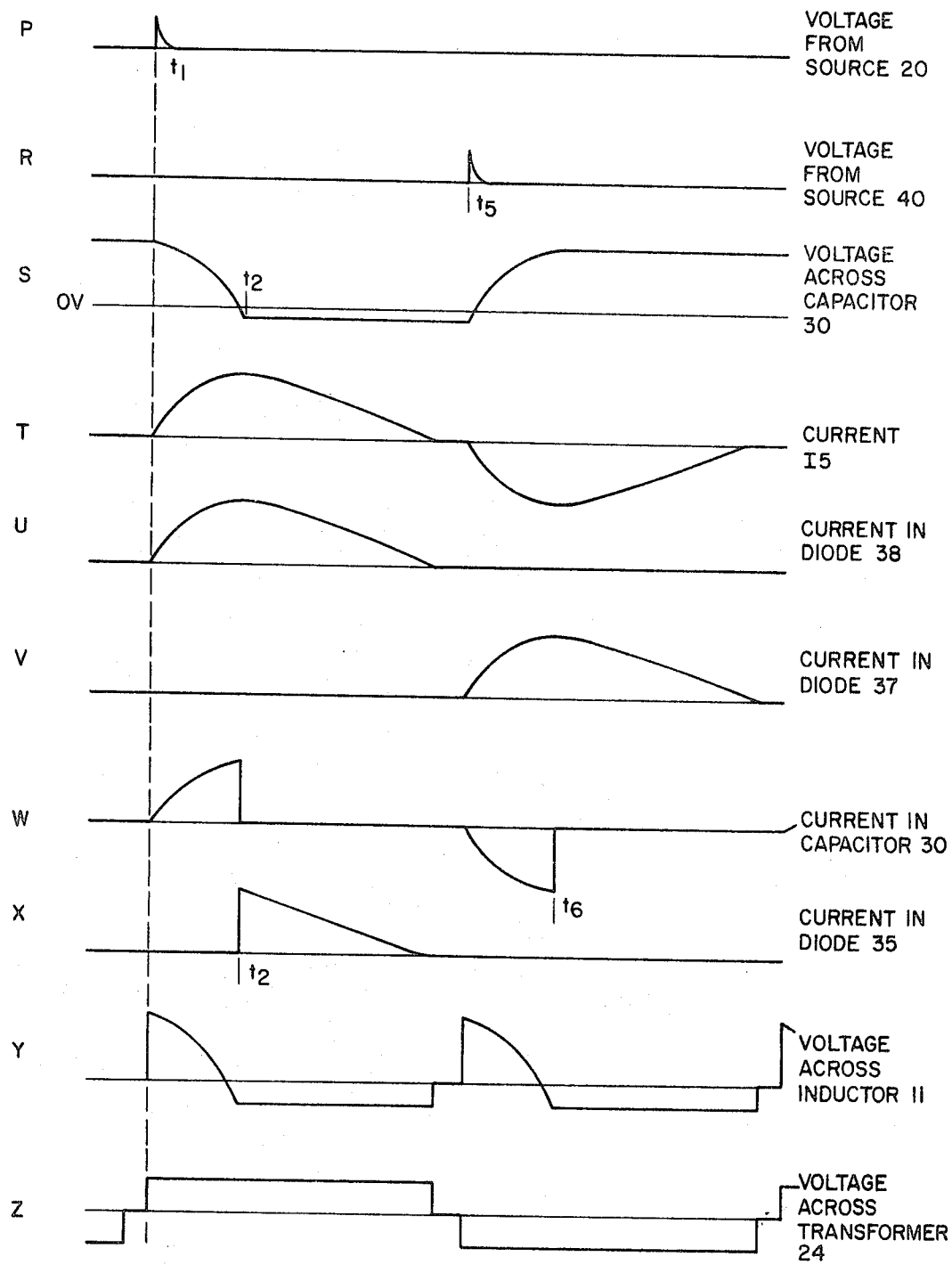
FIG. 2 illustrates waveforms which are useful in explaining the operation of the circuit shown in FIG. 1.

The operation of the instant invention may be more clearly seen by reference to the voltage and current waveforms shown in FIG. 2.

Waveforms P and R illustrate graphically the output voltages from signal sources 20 and 40 respectively.

Waveform S illustrates graphically the voltage across capacitor 30.

Waveform T illustrates the current through the primary winding 25 of the transformer 24.

Waveforms U and V illustrate the electrical currents through diodes 38 and 37 respectively.

Waveform W illustrates the electrical current in capacitor 30.

Waveform X illustrates the electrical current in diode 35.

Waveform Y illustrates the voltage across winding 12 of inductor 11.

Waveform Z illustrates the voltage across the windings of transformer 24.

Thus, the objects set forth herein are realized by the instant invention wherein a novel switching regulator provides low power losses in the windings of the transformer and the inductor by increasing the time duration of output current pulses and decreasing the amplitude of these current pulses. The instant invention also reduces the amount of power loss by decreasing the amount of energy stored in the core of the inductor and power transformer. Losses are also reduced by providing a switching regulator which uses low-voltage diodes having a low forward voltage drop so that power losses in the diodes are reduced. Reduction of these losses causes the instant invention to have an efficiency which is appreciably larger than prior art switching regulators.

While the principles of the invention have now been made clear in an illustrated embodiment, there will be immediately obvious to those skilled in the art many modifications, of structure, arrangement, proportions, elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A switching regulator for use with first and second automatically controlled signal sources and a power supply having a positive terminal and a negative terminal, said regulator comprising:

an inductor having a winding, said winding having a center tap;

first and second controllable rectifiers each having an anode, a cathode and a gate, said anode of said first rectifier being connected to said positive terminal of said supply, said cathode of said first rectifier being connected to a first end of said inductor winding, said first signal source being connected between said gate and said cathode of said first rectifier, said anode of said second rectifier being connected to a second end of said reactor winding, said cathode of said second rectifier being connected to said negative terminal of said source, said second signal source being connected between said gate and said cathode of said second rectifier;

a transformer having a primary winding and first and second secondary windings, first, second and third capacitors, said first capacitor being connected between a first end of said primary winding and said positive terminal, a second end of said primary winding being connected to said center tap, said second capacitor being connected between said first end of said primary winding and said negative terminal; and first, second, third and fourth diodes each having an anode and a cathode, said anode of said first diode being connected to a first end of said first secondary winding, said third capacitor being connected between said cathode of said first diode and a second end of said first secondary winding, said anode of said second diode being connected to a second end of said second secondary winding, said cathode of said second diode being connected to said cathode of said first diode, a first end of said second secondary winding being connected to said second end of said first secondary winding, said third diode being connected between said positive terminal of said source and said first end of said primary winding, said fourth diode being connected between said negative terminal of said source and said first end of said primary winding of said transformer.

2. A switching regulator is defined in claim 1 wherein:

said first and said second signal sources have a control terminal, said first and second signal sources each developing output pulses having a frequency determined by the value of a voltage applied to said control terminal; and said regulator includes means for coupling said control terminal of said first and said signal sources to said third capacitor.

3. A switching regulator as defined in claim 1 wherein:

said third and said fourth diodes are low voltage diodes.

4. A switching regulator for use with a power supply having a positive terminal and a negative terminal, said regulator comprising:

an inductor having a winding, said winding having a center tap;

first and second controllable rectifiers each having an anode, a cathode and a gate, said anode of said first rectifier being connected to said positive terminal of said supply, said cathode of said first rectifier being connected to a first end of said inductor winding;

first and second signal sources having a control terminal, each of said signal sources having first and second output terminals, each of said signal sources developing output pulses having a frequency determined by the value of a voltage applied to said control terminal, said first output terminal of said first signal source being connected to said gate of said first rectifier, said second output terminal of said first signal source being connected to said cathode of said first rectifier, said anode of said second rectifier being connected to a second end of said inductor winding, said cathode of said second rectifier being connected to said negative terminal of said supply, said first output terminal of said second signal source being connected to said gate of said second rectifier, said second output terminal of said second signal source being connected to said cathode of said second rectifier;

a transformer having a primary winding and first and second secondary windings;

first, second and third capacitors, said first capacitor being connected between a first end of said primary winding and said positive terminal, a secondary end of said primary winding and said positive terminal, a secondary end of said primary windings being connected to said center tap, said second capacitor being connected between said first end of said primary winding and said negative terminal;

second, third and fourth diodes each having an anode and a cathode, said anode of said first diode being connected to a first end of said first secondary winding, said third capacitor being connected between said cathode of said first diode and a second end of said first secondary winding, said anode of said second diode being connected to a second end of said second secondary winding, said cathode of said second diode being connected to said cathode of said first diode, a first end of said second secondary winding being connected to said second end of said first secondary winding, said third diode being connected across said first capacitor, said fourth diode being connected across said second capacitor; and means for coupling said third capacitor to said control terminal of said first and said second sources so that output pulses developed by said first and said second signal sources each have a frequency determined by the voltage across said third capacitor.

5. A switching regulator as defined in claim 4 wherein:

said third and said fourth diodes are low-voltage diodes.

* * * * *